United States Patent [19]

Chaput et al.

[11] Patent Number: 5,555,392
[45] Date of Patent: Sep. 10, 1996

[54] METHOD AND APPARATUS FOR A LINE BASED NON-BLOCKING DATA CACHE

[75] Inventors: Robert B. Chaput, Beaverton; Randy L. Steck, Hillsboro, both of Oreg.

[73] Assignee: Intel Corporation, Santa Clara, Calif.

[21] Appl. No.: 130,284

[22] Filed: Oct. 1, 1993

[51] Int. Cl.⁶ .................................................. G06F 12/02
[52] U.S. Cl. .................. 395/445; 395/471; 395/490; 364/DIG. 1; 364/243.41
[58] Field of Search ........................... 395/400, 425, 395/403, 440, 445, 455, 453, 460, 471, 472, 490

[56] References Cited

U.S. PATENT DOCUMENTS

| | | | |
|---|---|---|---|
| 4,910,656 | 3/1990 | Scales, III et al. | 395/471 |
| 5,073,969 | 12/1991 | Shoemaker | 395/725 |
| 5,193,167 | 3/1993 | Sites et al. | 395/490 |
| 5,202,969 | 4/1993 | Sato et al. | 395/470 |
| 5,287,508 | 2/1994 | Hejna, Jr. et al. | 395/650 |
| 5,325,510 | 6/1994 | Frazier | 395/445 |
| 5,353,426 | 10/1994 | Patel et al. | 395/445 |
| 5,367,660 | 11/1994 | Gat et al. | 395/403 |
| 5,404,484 | 4/1995 | Schlansker et al. | 395/460 |
| 5,410,668 | 4/1995 | Hilton | 395/466 |
| 5,410,669 | 4/1995 | Biggs et al. | 395/445 |
| 5,455,924 | 10/1995 | Shenoy et al. | 395/445 |
| 5,465,342 | 11/1995 | Walsh | 395/446 |
| 5,488,709 | 1/1996 | Chan | 395/445 |
| 5,493,668 | 2/1996 | Elko et al. | 395/457 |

*Primary Examiner*—Eddie P. Chan
*Assistant Examiner*—Hiep T. Nguyen
*Attorney, Agent, or Firm*—Blakely, Sokoloff, Taylor & Zafman

[57] ABSTRACT

A method and apparatus for providing a non-blocking cache that uses substantially less die area than a prior art non-blocking cache. In the present invention, pending count and ignore fill fields are added to each line of the cache. These fields are used in conjunction with a valid field (that indicates whether or not the line contains valid data) to keep track of the status of pending load operations that have resulted in cache misses. The pending field keeps a count of the number of outstanding load misses for the line. If a store occurs for an address of a line, the ignore fill field is set to indicate that any fills that are pending for the line are to be ignored because the pending fills will be supplying stale data to the line.

8 Claims, 4 Drawing Sheets

METHOD AND APPARATUS FOR A LINE BASED NON-BLOCKING DATA CACHE

BACKGROUND OF THE INVENTION

1. Field of the Invention

The present invention relates to the field of computer systems. More specifically, the present invention relates to a memory cache within a computer system.

2. Art Background

A cache is a special memory subsystem in which frequently used data values from main memory are duplicated for quick access. Although main memory is typically implemented using dynamic random access memory (DRAM), a cache is typically implemented using static random access memory (SRAM). Because SRAM can be accessed faster than the less expensive DRAM, a cache can be accessed faster than can main memory. Furthermore, a data cache typically has a dedicated high speed bus (wires) coupling the cache to the processor. Main memory, on the other hand, typically is coupled to the processor by a slower bus that frequently must be shared with other devices.

A memory cache stores the contents of frequently accessed random access memory (RAM) locations and the addresses where these data items are stored. When a processor references an address in main memory, a check is made to determine whether or not the cache holds a copy of the contents stored at the desired address. If cache does hold a valid copy of the contents stored at the desired address, the data is quickly returned to the processor from the cache. On the other hand, if the cache does not hold a valid copy of the contents stored at the desired address, a regular main memory access occurs. A cache is useful when RAM accesses to main memory are slow compared with the microprocessor speed. This is because an access to cache memory is typically faster than an access to main memory.

Frequently multiple levels of caching are provided. Thus, a processor will typically have a small primary cache located on the same integrated circuit chip as the processor. A secondary cache is then provided separate from the integrated circuit chip containing the processor. The smaller a cache is, the less data it is able to hold, and therefore, the more likely it is that data which has been requested will not be available within the cache. Generally, a primary (level one) cache will be several orders of magnitude smaller than a secondary (level two) cache. The secondary cache, in turn, will be several orders of magnitude smaller than main memory. Thus, for example, a level one cache may be approximately one kilobyte (KB) in size, a level two cache may be approximately one megabyte (MB) in size and main memory may be several megabytes in size.

A cache "hit" is said to have occurred when data requested from a cache is found in the cache. On the other hand, if data requested from a cache is not found within the cache, then a cache "miss" is said to have occurred. Typically, a processor will attempt to access the primary cache first. If a primary cache miss occurs, the processor will then attempt the secondary cache. If a miss occurs in the secondary cache, then the processor will try the next level of cache. When all levels of cache have been exhausted and a cache hit has not occurred, the processor will finally request the data from main memory.

If a processor is a single scalar processor, it executes only one instruction at a time. In one categorization scheme, the instructions executed by the processor can be categorized as being load instructions, store instructions or general instructions. Data from main memory is stored in a register of the register file by the execution of a load instruction. Data residing in a register of file register file is stored in main memory by executing a store instruction. A typical general instruction will cause data stored in one or more registers of the register file to be used to produce a result. The result is then returned to a register of the register file where it is stored.

Thus, for example, it might take the execution of four instructions to add a first number, stored at a first address of main memory, to a second number, stored at a second address of main memory, and store the obtained sum at a third address of main memory. A first load instruction would cause the data stored at the first address of main memory to be stored in the first register of the register file. Then, a second load instruction would cause the data stored at the second address of main memory to be stored in the second register of the register file. Next, a general type add instruction would be executed. The add instruction would take the numbers stored in the first and second registers, calculate a resulting sum, and then store the resulting sum in a third register of the register file. Finally, a fourth instruction would be executed. The fourth instruction would be a store instruction that would cause the sum stored in the third register of the register file to be stored at the third address of main memory.

Before the example add instruction can be executed, the proper data must be loaded into the first and second registers. If a valid copy of the data to be loaded was not stored in the cache then a cache miss would occur. When a single scalar processor has a cache miss, execution stalls while higher levels of cache are checked, and if necessary, the data required to execute the instruction is retrieved from main memory. A cache using this scheme is called a blocking cache. This is because, if there is a cache miss, execution of instructions is blocked until the requested data causing the miss has been supplied. Because the processor stays idle while waiting for the requested data to be provided, a high miss rate can cause serious degradation in the performance of the processor.

In contrast to a single scalar processor, a superscalar processor is capable of executing more than one instruction at a time. Out-of-order processors also exist that, while they may only be able to execute one instruction at a time, are able to alter the order of instructions which they are executing. In both out-of-order and superscalar processors, a performance benefit can be achieved by implementing the caches in a non-blocking manner.

In a non-blocking cache, if an instruction causes a cache miss, execution of the stalling will be deferred while the required data that caused the cache miss is retrieved. The processor, however, is able to continue executing instructions of the instruction stream that are subsequent to a stalled instruction. Thus, a subsequent instruction can be executed if the subsequent instruction does not depend upon the data being retrieved for the stalled instruction and also does not depend upon a result derived from the data being retrieved for the stalled instruction. Of course, a subsequent instruction that also causes a cache miss will have its execution deferred while the data retrieval of the data causing the second cache miss is pending. Thus, the processor does not stall when a cache hit occurs. Instead, the processor continues to execute instructions for which data is available until the requested missing data is returned. Then, the processor executes the instruction that was delayed while the retrieval of the data was pending. In a superscalar or out-of-order processor a significant performance increase can result through the addition of a non-blocking cache.

In a typical non-blocking cache, extra registers sometimes referred to as miss information status holding registers (MSHRs) are added to a cache to keep track of outstanding data requests caused by cache misses. The MSHRs are typically implemented using content addressable memory (CAM) and can handle on the order of four outstanding misses for the cache. Special conflict resolution logic is also added to the cache to ensure proper operation when the processor issues a request for a data address that corresponds to an outstanding cache miss.

The addition of the MSHRs and conflict resolution logic to a small cache can greatly increase the amount of die area required for the cache. In some cases, simply increasing the size of a blocking cache by the amount of die area that would be added to provide a non-blocking feature will result in the same performance increase as would be realized by adding the non-blocking feature. This is because increasing the size of the cache will increase the hit rate for the cache because, with more data stored in the cache, the probability that the desired data will be in the cache is increased. In turn, a higher hit rate will decrease the number of times that the processor will stall because of a miss.

SUMMARY OF THE INVENTION

A method and apparatus is disclosed for providing a non-blocking cache that uses substantially less die area than a prior art non-blocking cache. In the present invention, pending count and ignore fill fields are added to each line of the cache. These fields are used in conjunction with a valid field (that indicates whether or not the line contains valid data) to keep track of the status of pending load operations that have resulted in cache misses. The pending field keeps a count of the number of outstanding load misses for the line. If a store occurs for an address of a line, the ignore fill field is set to indicate that any fills that are pending for the line are to be ignored because the pending fills will be supplying stale data to the line.

BRIEF DESCRIPTION OF THE DRAWINGS

The objects, features, and advantages of the method and apparatus of the present invention will be apparent from the following detailed description of the invention in which.

DETAILED DESCRIPTION OF THE INVENTION

A method and apparatus is disclosed for providing a non-blocking cache that uses substantially less die area than a prior art non-blocking cache. In the present invention, pending count and ignore fill fields are added to each line of the cache. These fields are used in conjunction with a valid field (that indicates whether or not the line contains valid data) to keep track of the status of pending load operations that have resulted in cache misses. The pending field keeps a count of the number of outstanding load misses for the line. If a store occurs for an address of a line, the ignore fill field is set to indicate that any fills that are pending for the line are to be ignored because the pending fills will be supplying stale data to the line.

In the following description, for purposes of explanation, specific numbers, materials and configurations are set forth in order to provide a thorough understanding of the present invention. It will be apparent to one skilled in the art, however, that the present invention may be practiced without these specific details. In other instances, well known systems are shown in diagrammatic or block diagram form in order not to obscure the present invention unnecessarily.

Figure 1:
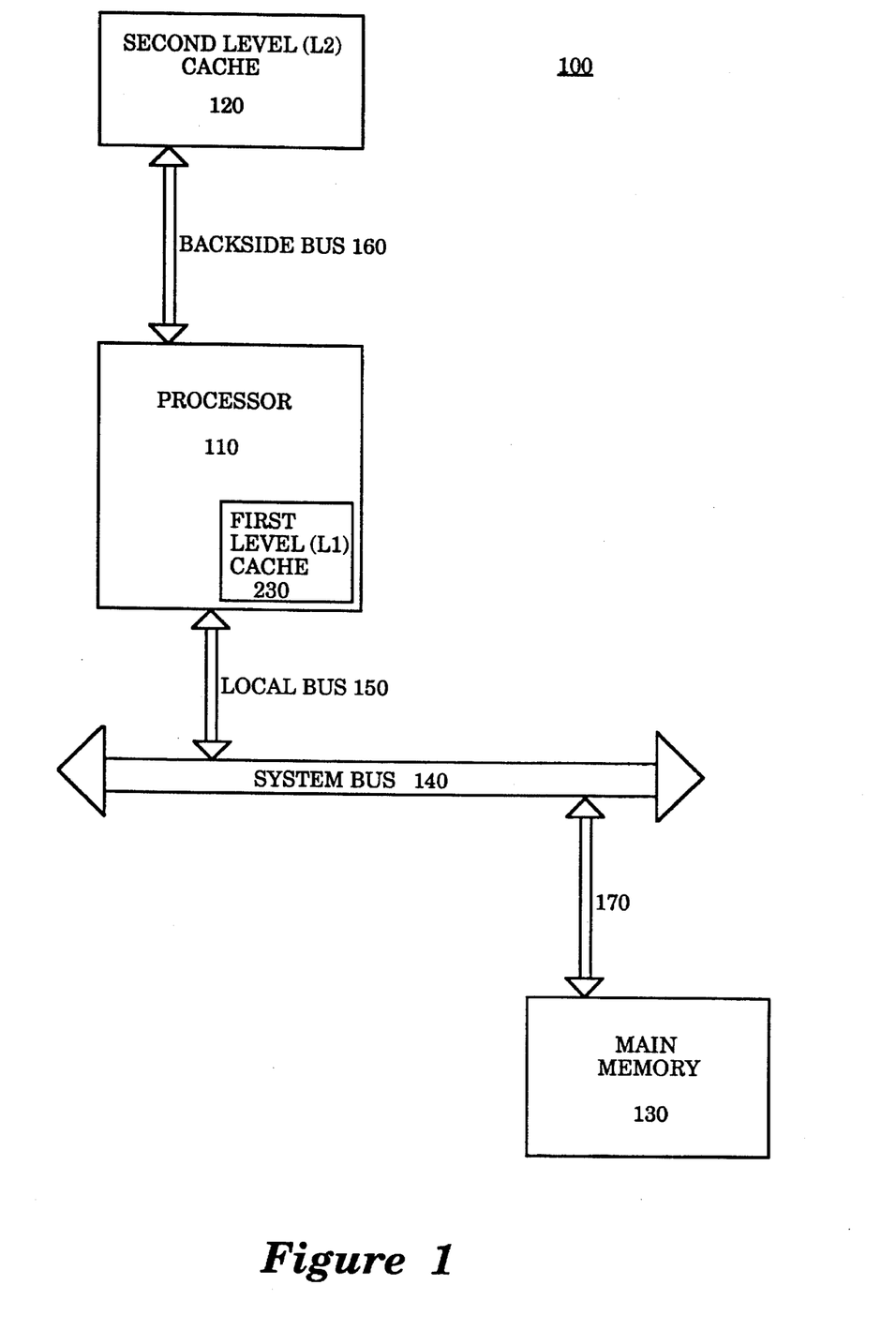
FIG. 1 illustrates a computer system having a processor with a non-blocking first level cache that employs the method and apparatus of the present invention.

FIG. 1 illustrates a computer system having a non-blocking first level cache that employs the method and apparatus of the present invention. In FIG. 1, computer system 100 is comprised of processor 110, second level (L2) cache 120 and main memory 130. Processor 110 is an integrated circuit that has a first level (L1) cache 230. L1 cache 230 is a non-blocking cache employing the method and apparatus of the present invention. Although an embodiment can exist where processor 110 is a single scalar processor, in order to exploit the non-blocking feature of L1 cache 230, processor 110 will typically be a superscalar or out-of-order processor.

Processor 110 is coupled to a second level (L2) cache 120 by backside bus 160. Processor 110 is also coupled to main memory 130 through a series of busses. In the embodiment depicted in FIG. 1, processor 110 is coupled to a system bus 140 by a local bus 150. System bus 140, in turn, is coupled to main memory 130 by bus 170. Typically, additional devices (not shown) will be coupled to system bus 140. Examples of these additional devices include disk drives, network adapter cards and input/output devices. In an alternate embodiment, computer system 100 will be a multiprocessor system. As such, computer system 100 will have more than one processor 110 coupled to system bus 140. Typically, each processor 110 of the multiprocessor system will have its own associated L2 cache 120.

Although system 100 is illustrated having two levels of caching, the method and apparatus of the present invention is equally applicable to any number of levels of caches and can be applied to any level cache therein. Because L1 cache 230 is a non-blocking cache, and further because processor 110 is a superscalar or out-of-order processor, if a cache miss occurs for L1 cache 230 for a particular instruction, processor 110 will not have to stall. Instead, processor 110 can continue executing subsequent instructions which do not depend upon the missed data or any results derived therefrom.

Figure 2:
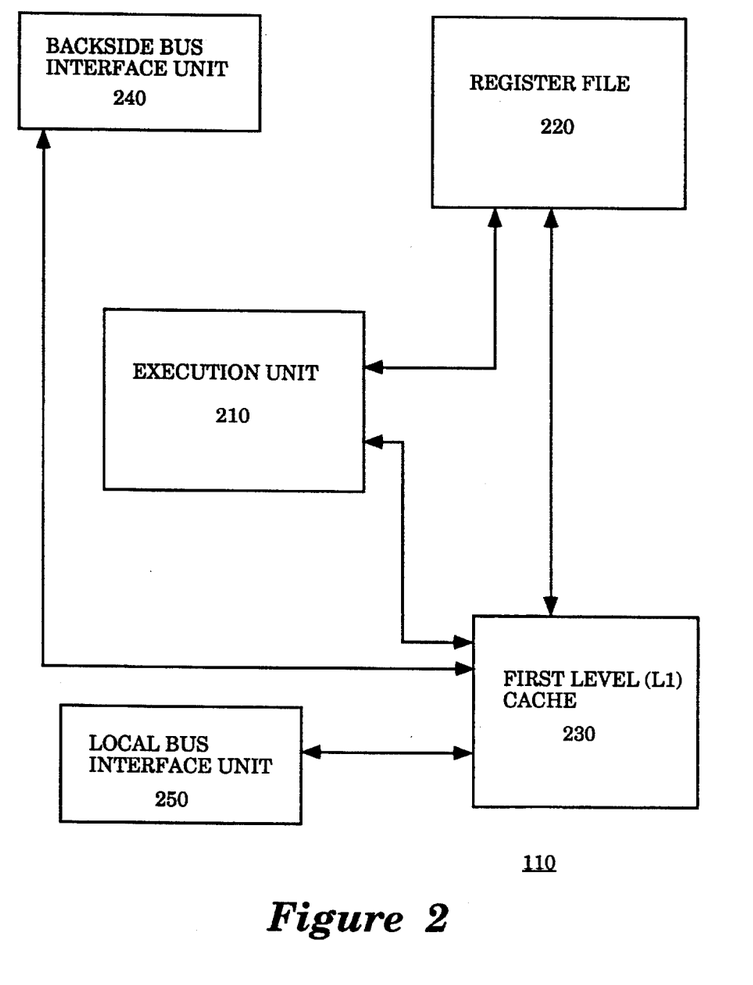
FIG. 2 is a block diagram showing the pertinent components of the processor of FIG. 1.

Referring now to FIG. 2, a block diagram is depicted that shows the logical components of processor 110 that are relevant to the invention. Execution unit 210 executes instructions for processor 110. Execution unit 210 operates by retrieving data stored in registers of register file 220 and performing operations specified by the general instructions to be executed. Typically, execution unit 210 then writes the output resulting from the executed instruction back to a destination register within register file 220.

If a load instruction is executed by execution unit 210, data specified by a main memory address will be loaded into a register of register file 220 that was specified by the load instruction. If a valid copy of the requested data is available within L1 cache 230, the data will be loaded immediately into register file 220. On the other hand, if the data is not available within L1 cache 230, a L1 cache miss will occur and L1 cache 230 will request the data from the L2 cache by making the request to backside bus interface unit 240. If the requested data is stored in the L2 cache, then it will be returned to L1 cache 160 by backside bus interface unit 240 and to register file 220.

On the other hand, if the data requested is also not stored within the L2 cache, backside bus interface unit 240 will request the data from main memory by placing a request to local bus interface unit 250. When the data is retrieved from main memory, it will be returned to the L2 cache, the L1 cache and the register file 220.

Because L1 cache 230 is a non-blocking cache, if execution unit 210 is either a superscalar processor or an out-of-order processor, if a L1 cache 230 miss occurs, execution unit 210 is able to continue executing instructions that do not depend upon the instruction that caused the L1 cache 230 miss. Then, when the data requested by the instruction associated with the L1 cache 230 miss is returned to register file 220, execution unit 210 is able to return to the delayed instruction and execute it. In cases where the L1 cache 230 miss rate is relatively high, the non-blocking feature of cache 230 greatly increases the performance of execution unit 210. This is because a L1 cache 230 miss does not stall the execution unit.

Figure 4:
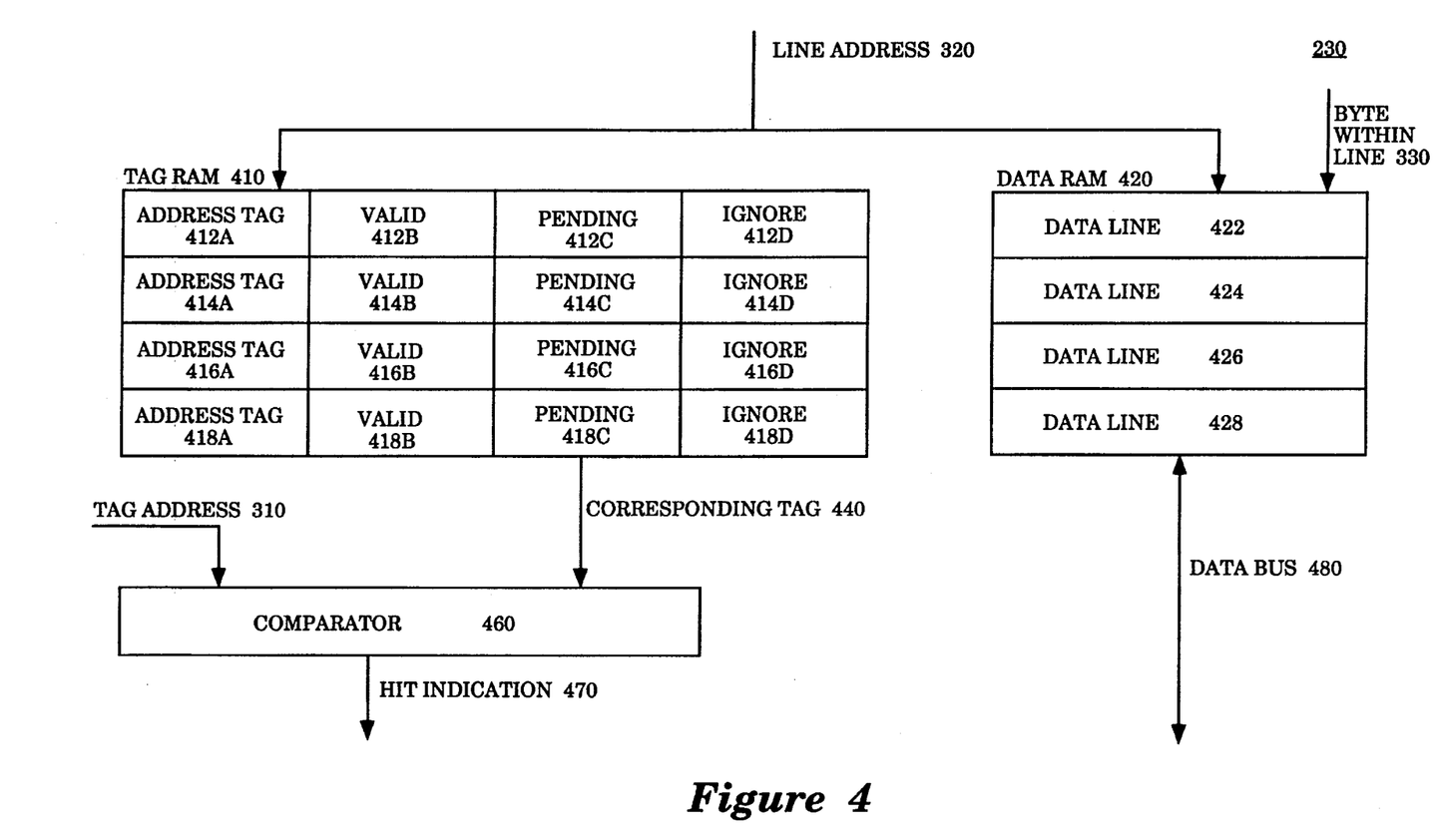
FIG. 4 illustrates a non-blocking cache that employs the method and apparatus of the present invention; and, FIG. 5 illustrates a state transition diagram for an embodiment of the non-blocking cache of FIG. 4 that permits up to three pending cache misses per line of the cache.

Referring now to FIG. 4, a non-blocking cache employing the method and apparatus of the present invention is illustrated. The primary components of cache 230 are tag RAM 410, data RAM 420 and comparator 460. Data RAM 420 is divided into lines, with each line able to store a copy of a predetermined sized contiguous portion of main memory. Tag RAM 410 has the same number of lines as data RAM 420 and each line of tag RAM 420 corresponds to a line of data RAM 420. Thus, in the simple cache depicted in FIG. 4, data RAM 420 is able to store four lines of data identified as data lines 422, 424, 426 and 428 and each line of data has a corresponding tag RAM line. For example, the tag RAM 410 line containing the fields address tag 412A, valid 412B, pending 412C and ignore 412D corresponds to data line 422.

Each line of tag RAM 410 stores a sufficient amount of information to determine the line of physical memory, if any, that is stored in the corresponding line of data RAM 420. In the four line embodiment of FIG. 4, this information is stored in the address tag field 412A, 414A, 416A and 418A for the first through fourth lines, respectively. Each line of tag RAM 410 also includes information such as a valid bit 412B that identifies whether the corresponding data stored in data line 422 of data RAM 420 is valid or not.

Figure 3:
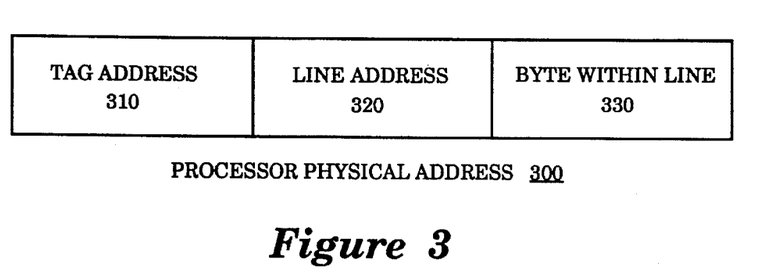
FIG. 3 shows a typical processor physical address.

Referring now to FIG. 3, a typical processor physical address is illustrated. A particular processor physical address 300 uniquely identifies an address within main memory. A processor uses processor physical address 300 to specify that the contents stored at the location in main memory corresponding to the address 300 are to be accessed during a load or store operation.

In FIG. 3, processor physical address 300 is divided into three fields to divide the physical address space used by a processor into lines. Each of these lines corresponds to a contiguous portion of main memory. A copy of a line of main memory is stored in a line of a data cache. Tag address field 310 is formed by a predetermined number of most significant bits of processor physical address 300 and uniquely identifies a particular line. A predetermined number of the least significant bits of processor physical address 300 form byte within line field 330. Field 333 is used to specify a particular byte to be accessed within a line. The remaining "middle" bits of processor physical address 300 not belonging to tag address 310 or byte within line field 330 are used to specify a line address 320.

When data contained in a particular line is required by the processor, all of the data within the line containing the data required is read into a line of the cache. This is best illustrated by example. In an example embodiment, the physical address space of a processor is specified by a 32-bit number. In this example, the primary cache is one kilobyte in size, and each line is 8 bytes long. In this example, the primary cache is able to hold 128 lines of memory. In this example, the processor would request a physical address to access by specifying a 32-bit integer. The three least significant bits ($2^3=8$) of the physical address 300 would be used to form the field byte within line 330. The next seven bits ($2^7=128$) above byte within line field 330 would provide a line address 320. The remaining 22 most significant bits of processor physical address 300 would provide a tag address 310. Referring again to FIG. 4, the tag address 320 is compared by comparator 460 to at least one address tag of tag RAM 410 to determine whether a particular line stored within cache 230 contains a copy of the data specified by the processor physical address. If a copy is found, and the corresponding valid field indicated that the line is valid, then a cache hit has occurred.

In one embodiment, cache 230 is a direct mapped cache. In a direct mapped cache, there is only one line within data RAM 420 where the requested data line will be stored. By parsing the physical address requested into constituent sub fields, line address field 320 of the physical address specifies the line within data RAM 420 that would have a copy of the data stored at the physical address requested. Corresponding tag 440 is the address tag stored in tag RAM 410 corresponding to the line specified. Corresponding tag 440 would be compared to the tag address field 310 and, if they matched, a cache hit would be declared (provided the valid field indicated that the data in the line was valid). For a cache hit, the line address field 320 and the byte within line field 330 are then used to retrieve the requested data from the corresponding line of data RAM 420 and the requested data is sent on data bus 480 to the register file.

If the tag address 310 does not match the corresponding tag 440, then a cache miss has occurred. A cache miss will also occur if the valid field indicates that the data line is not valid even though the tag address 310 does match the corresponding tag 440. When a cache miss occurs, the pending and ignore fields of the line specified by the line address 320 field are updated to keep track of the pending data request. The pending field keeps track of the number of cache misses pending for the line. The ignore field is a logical field that is set if a store operation occurs to the line while the line has a pending cache miss. The ignore field indicates that any fills of the line that result from pending cache misses are to be ignored. This is because they will be filling the line with stale data because the store operation is updating the data in the line. A cache miss is handled according to the state transition diagram of FIG. 5.

Figure 5:
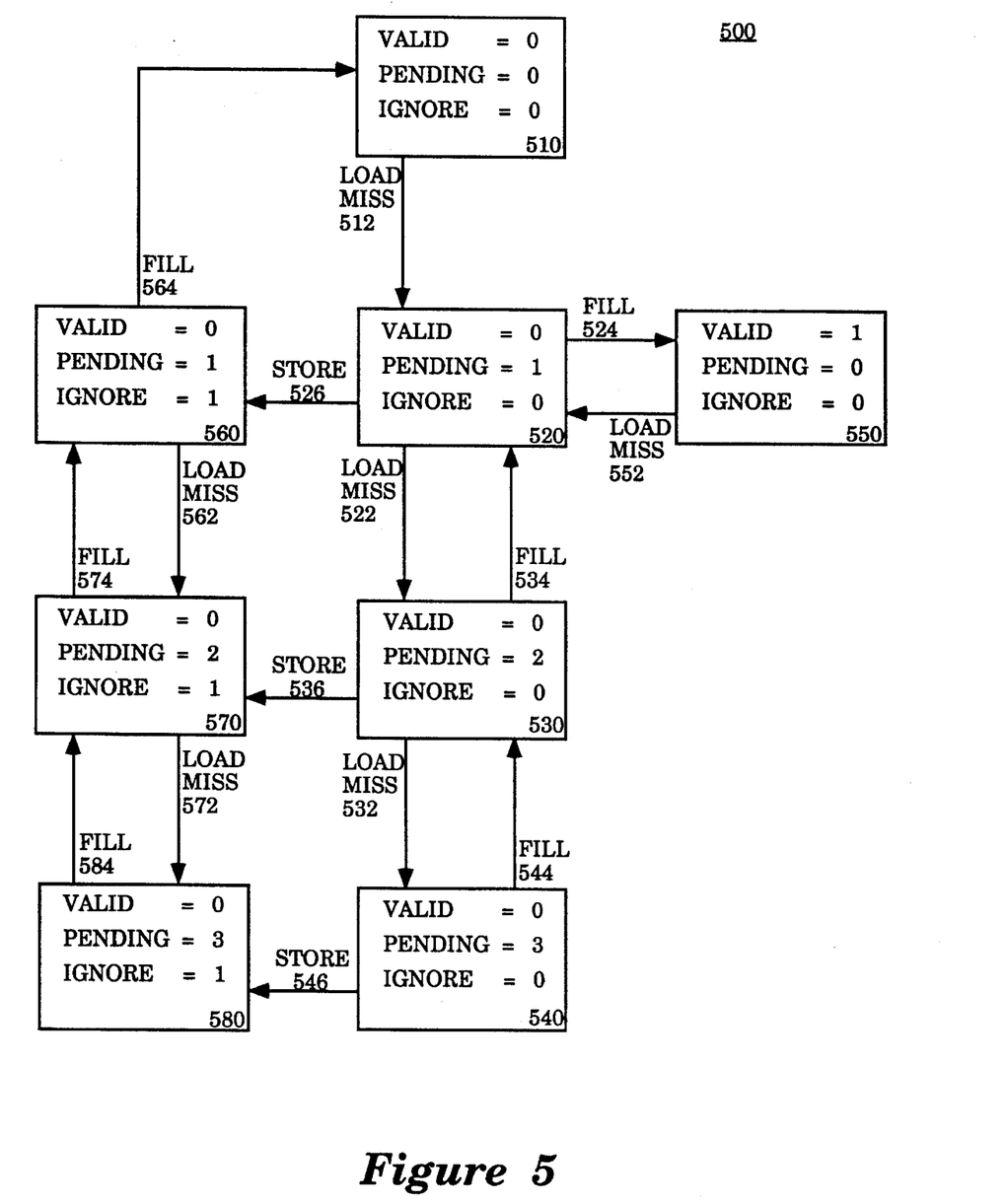

Before discussing the state transition diagram of FIG. 5, it is important to note that, in alternate embodiments, cache 230 can be a set associative or fully associative cache instead of a direct mapped cache. In a set associative cache embodiment, rather than there being only one location within data RAM 420 that could store the requested address, there is a set of possible locations and each must be checked before a miss is declared. In a fully associative cache embodiment, a line of data can reside within any line of data RAM 420.

Therefore, each line of tag RAM 410 must be checked before a cache miss can be declared. Typically, if a fully associative cache is implemented, tag RAM 410 will be content addressable memory (CAM).

Referring now to FIG. 5, a state transition diagram is shown that depicts how the valid, pending and ignore fields within file tag RAM change during state transitions. Three different events can cause a state transition: a load miss event, a fill event and a store event. The first event that can cause a state transition is a load miss. A load miss occurs when the processor attempts to load information into a register of the register files from the primary cache and the information to be loaded is not available in the primary cache. A load miss causes a fill request to be generated. A fill event occurs when, in response to the fill request generated by the load miss, the required information is provided to the primary cache (from a higher level cache or from main memory). Finally, a store operation will occur when the processor stores information residing in a register of the register file to main memory.

In FIG. 5, a cache hit will only occur when the tag address derived from the processor physical address matches the address tag in the tag RAM and the valid, pending and ignore fields are those indicated in state 550 (i.e. valid=1, pending=0 and ignore=0). In state 550, the valid field is a logical 1 to indicate that the data line contains a valid copy of data. Note that in state 550, there are no pending fills resulting from cache misses and the ignore fill field is a logical zero to indicate that a fill is not to be ignored. In every state of transition diagram 500 other than state 550, the valid field is a logical 0 to indicate that the data line does not contain a valid copy of data. Thus, in every state of FIG. 5 other than state 550, even if the tag address derived from the processor physical address matches the address tag in the tag RAM, a cache miss will occur because the line will contain data that is not valid.

In the state machine of FIG. 5, up to three pending requests can occur for each line of the cache before a stall of the processor will occur. In alternate embodiments, more or fewer, pending requests per line can be implemented by adjusting the number of states within the state machine. Adding more states is achieved by applying three basic state transition rules. First, whenever a load miss event occurs, the pending field is incremented by one to indicate that a fill request has been generated. Second, whenever a fill event occurs, the pending field is decremented by one to indicate that one pending fill request generated by a load miss on that line has been satisfied. Third, whenever a store event occurs, the valid and pending fields will remain unchanged and the ignore fill field will be set to logical 1. Setting the ignore fill field to logical 1 will indicate that any fills from pending fill requests for that line are to be ignored because they will return data made stale by the store operation.

In FIG. 5 there are three special case states. As discussed above, in the special case of state 550, the corresponding line contains valid data. Therefore, a load miss in state 550 will cause the valid flag to transition from logical 1 to logical 0 to indicate that the data of the line is no longer valid. As with any other state, the pending count will be incremented to show that there is a pending fill that was caused by the load miss.

The second special state is state 520. In state 520, valid is equal to 0, pending is equal to 1 and ignore is equal to 0. This is the case where the data line is not valid, there is only one pending fill and fills are not to be ignored wherein "ignoring a fill" means that the valid bit is not to be set when a fill event occurs. Therefore, in state 520, a fill event will cause the valid field to change and indicate that the line is valid. Note that state 520 is the only state that can transition to state 550 and thereby transition from invalid data on the line to valid data on the line.

The third special state is state 560. In state 560, the ignore fill field is logical 1, the pending field is 1 and the valid field is logical 0. Thus, in state 560, the data in the line is not valid, there is only one pending fill for the line and, fills are to be ignored. This will happen when a store operation for the line occurs after the load miss that caused the pending fill to be requested. State 560 is the only state where the ignore fill field will be changed from a logical 1 (ignore fill) to a logical 0 (do not ignore fill). This happens when a fill occurs in state 560 because the fill is the only pending fill for the line and any subsequent fills will occur after the store operation that set the ignore fill field happened. Therefore, the subsequent fills will not return stale data and should not be ignored.

The operation of state machine 500 is best illustrated by example. In Example 1 of Table 1, two instructions occur sequentially. The first instruction is an attempt to load the information stored at address A1 into the register file and the second instruction is an attempt to load the information stored at address A2 into the register file. In Example 1, address A1 and A2 have the same line address 320. In Example 1, the main memory lines containing the data stored at A1 and A2 are not currently stored within the primary cache therefore two load misses occur.

TABLE 1

| EXAMPLE 1 | | | | | |
|---|---|---|---|---|---|
| Time | Pending | Ignore | Address | Valid | Operation |
| $t_0$ | 00 | 0 | X | 0 | A1 Access |
| $t_1$ | 01 | 0 | X | 0 | A2 Access |
| $t_2$ | 10 | 0 | X | 0 | A1 Return |
| $t_3$ | 01 | 0 | X | 0 | A2 Return |
| $t_4$ | 00 | 0 | A2 | 1 | |

Example 1 begins at time to when there is an attempt to load the information stored at address A1 and a load miss occurs. This corresponds to state 510 of FIG. 5 because the valid pending and ignore fields are all set to 0. The load miss for address A1 will cause a transition indicated by arrow 512 of FIG. 5 to the state 520. Therefore, at time $t_1$, the pending field will indicate that one fill is pending (that for the information stored at address A1) and the ignore and valid bits will be logical 0 to indicate that the current line in the cache is not valid and that the pending fill is not to be ignored.

At time $t_1$, when a load is attempted for the information stored at address A2, a second load miss will occur. The load miss for the address A2 corresponds to the state transition from state 520 to state 530 (indicated by arrow 522). Thus, the value stored in the pending field will be incremented to 2 (10 in binary) thereby indicating that two fill operations are pending (one for the data at address A1 and the other for the data at address A2). The ignore and valid fields will continue to stay set to logical 0 because of the pending fill requests.

At time $t_2$, the data line containing the data at address A1 is returned to the cache and a fill operation occurs. In both Example 1 and Example 2, the actual time that elapses between each event of the examples will not necessarily be uniform. Thus, the actual time that will elapse from time $t_1$ to time $t_2$ will depend upon how long the fill request initiated at time to takes to complete. This, in turn, will depend upon whether the data for the A1 fill is found in a higher level cache or in main memory. At time $t_2$, a transition is made from state 530 to state 520 as indicated by arrow 534 and there will be only one pending request for data (that of the data of address A2).

At time $t_3$, the data requested for address A2 is returned to the cache and a fill event occurs. This will cause a transition from state 520 to state 550 as indicated by arrow 524. At time $t_4$, there are no more pending requests and therefore the valid bit will be set to logical 1 to indicate that the data line is now valid. Once the data is valid, the data of address A2 can be retrieved and used by the processor.

In Example 1, because no valid data was stored until time $t_3$, the value in the address tag field is shown in Table 1 to be an X (meaning do not care what the value is). It is only at time $t_4$, when valid data is stored in the data line corresponding to the address tag field that the address tag matters. Note that the order in which the requests for address A1 or address A2 are returned does not matter. This is because both the A1 and A2 load instructions update the tag address 412A at the same time as the data line 422.

Referring now to Table 2, a second example is illustrated where a load is attempted for the contents stored at address A3, a store is made to address A4 and a load is attempted for the contents of address A5. In Table 2, addresses A3, A4 and A5 all have the same line address 320 and the data line is not resident in the cache at the start of the example.

TABLE 2

EXAMPLE 2

| Time | Pending | Ignore | Address | Valid | Operation |
|---|---|---|---|---|---|
| $t_5$ | 00 | 0 | X | 0 | A3 Access |
| $t_6$ | 01 | 0 | X | 0 | Store A4 |
| $t_7$ | 01 | 1 | X | 0 | A5 Access |
| $t_8$ | 10 | 1 | X | 0 | A3 Return |
| $t_9$ | 01 | 1 | X | 0 | A5 Return |
| $t_{10}$ | 00 | 0 | X | 0 | |

In a manner similar to the first example, the second example starts with a load miss caused by an A3 access at time $t_5$. This load miss corresponds to arrow 512 and a transition from state 510 at time $t_5$ to state 520 at time $t_6$.

At time $t_6$, an attempt is made to store information to address A4. This corresponds to arrow 526 and a transition from state 520 to 560 where the ignore fill field is set to logical 1. A logical 1 in the ignore fill field indicates that, because a store was made while a fill is pending, when the pending fill is returned, it is to be ignored. It is to be ignored because the data returned by the pending fill may have been changed by the store operation and hence will be stale.

At time $t_7$, an access is made to address A5 and a second load miss occurs. This corresponds to arrow 562 and a transition from state 560 to 570. When the information stored at address A3 is returned at time $t_8$, a transition will be made from state 570 to 560 as indicated by arrow 574. Then, when the information at address A5 returns at time $t_9$, a transition will be made from state 560 to state 510 as indicted by arrow 564 and the ignore fill and pending fields will be set to logical 0.

In a multiprocessor environment, if a processor is to modify data to be stored in main memory, it typically must issue an invalidate command to all the other processors. The invalidate command causes all of the other processors in the system to invalidate any cache entries in their caches that include data for the address that will be modified by the first processor. This permits the first processor to modify the data and prevents the other processors from accessing stale copies of the data that are stored within the caches which do not reflect the modification made by the first processor. In a multiprocessor environment, if the state transition event store is expanded to also be caused by invalidate commands, the present invention is able to accommodate multiple processors with only this minor modification.

While the method and apparatus of the present invention has been described in terms of a presently preferred and alternate embodiments, those skilled in the art will recognize that the present invention may be practiced with modification and alternation with the spirit and scope of the appended claims. The specifications and drawings are, accordingly, to be regarded in an illustrative rather than a restrictive sense.

What is claimed is:

1. A non-blocking data cache that contains data for use by a processor, comprising:

a data random access memory (RAM) that contains a plurality of lines of data;

a tag RAM coupled to the data RAM that contains information relating to each line of the plurality of lines of data, information relating to a line of data in the data RAM comprising:
an address tag;
a pending count;
an ignore indicator;

a comparator coupled to the tag RAM that compares a tag address with the address tag, the tag address being part of a physical address from the processor, and generates a hit indication indicating that data identified by the tag address from the processor is contained in the data RAM when the address tag matches the tag address, and generates a miss indication otherwise;

means responsive to the miss indication for causing the tag RAM to increment the pending count, wherein a non-zero pending count indicates that at least one fill to the line of data in the data RAM is pending, and for causing the tag RAM to decrement the pending count each time a fill to the line of data in the data RAM has been completed; and means responsive to the ignore indicator for ignoring a fill operation to the line of data in the data RAM when the pending count is not zero and data having a line address of the line of data in the data RAM has been stored.

2. The non-blocking cache of claim 1, wherein the information relating to a line of data in the data RAM further comprises a valid indicator that indicates that the line of data in the data RAM is valid when a fill to the line of data in the data RAM is completed and the pending count is zero.

3. A method of operation for a cache memory of a microprocessor system comprising the steps of:

(A) receiving a first physical address from the microprocessor comprising at least a tag address and a line address;

(B) comparing the tag address to an address tag of a tag random access memory (RAM) of the cache;

(C) generating a hit indication in response to a match between the tag address and the address tag, otherwise generating a miss indication;

(D) using the line address to identify a line of data in a data RAM of the cache to be accessed in response to the hit indication;

(E) incrementing a pending count in the tag RAM in response to the miss indication;

(F) decrementing the pending count in the tag RAM when a fill operation to the line of data has been completed;

(G) receiving a next physical address;

(H) repeating steps (A) through (F) irrespective of the pending count; and (I) setting an ignore fill indicator in the tag RAM when data having the line address has been stored for use by the microprocessor and the pending count is not zero.

4. The method of claim 3, further comprising the step of (J) performing step (H) irrespective of the ignore fill indicator.

5. The method of claim 4, further comprising the steps of:

(K) setting a valid indicator in the tag RAM when a fill to the line of data is completed and the pending count is zero;

(L) performing step H irrespective of the valid indicator.

6. A computer system comprising:

a processor;

a main memory coupled to the processor, the main memory comprising a plurality of storage locations, each storage location having a physical address comprising at least a tag address and a line address identifying the line of data;

a cache memory coupled to the processor and to the main memory, the cache comprising:

a data random access memory (RAM) containing a plurality of lines of data;

a tag RAM coupled to the data RAM, the tag RAM containing information relating to each line of the plurality of lines of data in the data RAM, information relating to a line of data in the data RAM comprising:

an address tag;

a pending count;

an ignore fill indicator;

a comparator coupled to the tag RAM that compares the tag address with the address tag, the comparator generating a hit indication indicating that data identified by the tag address is contained in the data RAM when the address tag matches the tag address, the comparator generating a miss indication otherwise;

means responsive to the miss indication for causing the tag RAM to increment a pending count, wherein a non-zero pending count indicates that at least one fill to the line of data is pending, and for causing the tag RAM to decrement the pending count each time a fill to the line of data is completed;

means responsive to the ignore indicator for ignoring a fill operation to the line of data when the pending count is not zero and data having a line address of the line of data has been stored.

7. The computer system of claim 6, wherein the information relating to a line of data in the data RAM further comprises a valid indicator indicating that the line of data is valid when a fill to the line of data is completed and the pending count is zero.

8. A non-blocking data cache containing data for use by a processor, comprising:

a data random access memory (RAM) containing a plurality of lines of data;

a tag RAM coupled to the data RAM containing information relating to each line of the plurality of lines of data, information relating to a line of data comprising:

an address tag;

a valid indicator;

a pending count;

an ignore indicator;

a comparator coupled to the tag RAM that compares a tag address with the address tags, the tag address being part of a physical address from the processor, the comparator generating a hit indication indicating that data identified by the tag address from the processor is available in the data RAM when the address tag matches the tag address the comparator generating a miss indication otherwise;

means responsive to the miss indication for causing the tag RAM to increment the pending count, a non-zero pending count indicating that at least one fill to the line of data is pending, and for causing the tag RAM to decrement the pending count each time a fill to the line of data is completed;

means responsive to the ignore indicator for ignoring a fill operation to the line of data when the pending count is not zero and data having a line address of the line of data has been stored for use by the processor; and wherein the valid indicator indicating that the line of data is valid when a fill to the line of data is completed and the pending count is zero.

* * * * *

UNITED STATES PATENT AND TRADEMARK OFFICE
CERTIFICATE OF CORRECTION

PATENT NO. : 5,555,392
DATED : Septmeber 10, 1996
INVENTOR(S) : Chaput et al.

It is certified that error appears in the above-identified patent and that said Letters Patent is hereby corrected as shown below:

In column 2 at line 4 delete "file register file" and insert --the register file--

In column 2 at line 63 delete "cache hit" and insert --cache miss--

In column 5 at line 67 delete "Field 333" and insert --Field 330--

In column 6 at line 20 delete "address 320" and insert --address 310--

In column 7 at line 7 delete "file tag" and insert --the tag--

In column 8 at line 42 delete "time to" and insert --time $t_0$--

In column 10 at line 14 delete "alternation" and insert --alteration--

In column 12 at line 25 delete "tags," and insert --tag--

Signed and Sealed this

Seventeenth Day of December, 1996

*Attest:*

BRUCE LEHMAN

*Attesting Officer*     *Commissioner of Patents and Trademarks*